(12) United States Patent
Moss

(10) Patent No.: US 6,406,106 B1
(45) Date of Patent: Jun. 18, 2002

(54) ENDLESS DRIVE TRACK WITH MOULDED TREAD BLOCKS AND TREAD SECTIONS

(76) Inventor: Alvin Edward Moss, 3 Gushue Avenue, Mount Pearl, NF (CA), A1N 2R2

( * ) Notice: Subject to any disclaimer, the term of this patent is extended or adjusted under 35 U.S.C. 154(b) by 0 days.

(21) Appl. No.: 09/722,833

(22) Filed: Nov. 27, 2000

Related U.S. Application Data

(63) Continuation-in-part of application No. 09/195,141, filed on Nov. 5, 1998, now abandoned.

(51) Int. Cl.$^7$ .............................................. B62D 55/24
(52) U.S. Cl. ...................................... 305/165; 305/178
(58) Field of Search ........................... 305/6, 157, 160, 305/165, 167, 177, 178

(56) References Cited

U.S. PATENT DOCUMENTS

| | | | | |
|---|---|---|---|---|
| 4,378,133 A | * | 3/1983 | Trautwein | |
| 4,613,006 A | * | 9/1986 | Moss et al. | 180/9.25 |
| 4,981,188 A | * | 1/1991 | Kadela | 180/9.25 |
| D333,110 S | * | 2/1993 | Mogi et al. | D12/7 |
| 5,427,443 A | * | 6/1995 | Muramatsu et al. | 305/6 X |

FOREIGN PATENT DOCUMENTS

| | | | | |
|---|---|---|---|---|
| JP | 56-142763 | * | 11/1981 | 305/177 |
| JP | 2-155888 | * | 6/1990 | |
| JP | 4-39180 | * | 2/1992 | |

* cited by examiner

Primary Examiner—Russell D. Stormer

(57) ABSTRACT

This present invention provides a novel form of endless drive track for snow vehicles and the like, comprising: an endless underlying drive support belt with a flat inner surface with lateral edges having a drive mechanism thereon. An outer surface comprising a plurality of tread blocks moulded transversely to the endless underlying drive support belt, the tread blocks having a greater length than the width of the endless underlying drive support belt. The tread blocks have inward angles extending outward from the lateral edges of the endless underlying drive support belt. The lower portion of the tread blocks has a solid base extending upwardly to a point where the tread blocks have a plurality of slots. The slots are strategically located in the tread blocks to cause a staggered pattern of tread sections with adjacent blocks. The slots divide the tread blocks into a plurality of tread sections causing a staggered pattern with an adjacent block, each tread section has its own radius, the combination of tread sections along the upper portion of each of the tread blocks will have a curved-like effect. The tread blocks inward angles extending outward from the lateral edges of the endless underlying drive support belt increases the tread blocks curved-like effect, allowing the track to have a greater leaning angle while lowering the vehicle's center of gravity. These and other aspects of the invention are described in the drawing.

8 Claims, 6 Drawing Sheets

ENDLESS DRIVE TRACK WITH MOULDED TREAD BLOCKS AND TREAD SECTIONS

This is a continuation-in-part of application Ser. No. 09/195,141, filed Nov. 5, 1998 and now abandoned.

BACKGROUND OF THE INVENTION

The present invention provides a novel form of endless drive track incorporating moulded tread blocks and tread sections designed to be used on snow and other substratums. The tread sections are configured in a staggered pattern along the outer surface of the track by a plurality of slots providing both longitudinal and lateral traction on snow and other surfaces, improving the maneuverability of the track.

Reference is made to inventors U.S. Pat. No. 4,613,006, FIGS. 6 and 7. Referring to FIG. 6 cleats 115 are of a solid form with ribs 117 attached to the outer peripheral surface 116 of cleats 115 to counteract lateral slippage of the drive track Unlike the upper portion of cleats 115 shown in FIG. 6, with the exception of ribs 117 attached to the outer peripheral surface 116 of cleats 115, the cleats referred to in the U.S. Pat. No. 4,613, 006, have no tread sections to provide a good gripping contact with the surface they are travelling on for lateral traction, therefore it has no real effective control of lateral slippage in certain snow conditions and on certain terrains. Whereas the track in the present invention has a plurality of slots and tread sections that will provide a good gripping contact with the surface travelled on, such as snow, mud, sand and all other terrains controlling lateral slippage. This configuration of tread sections also improves the maneuverability of the track. Each tread section can accommodate ice screws and/or studs for improved traction and braking action on ice and other slippery surfaces.

Unlike the track referred to in U.S. Pat. No. 4,613,006, FIG. 6, the track in the present invention is of a lighter weight by having a plurality of slots in the tread blocks, the slots will also displace the accumulation of snow, mud and other objects by centrifugal force as the slots pass over the front and rear drive pulleys.

Again referring to U.S. Pat. No. 4,613,006, FIG. 6, ribs 117 projecting outwardly from and extending transversely of the outer peripheral surface 116 of cleats 115 are parallel to the longitudinal axis of the track providing a minimal amount of forward traction on hard packed snow and ice surfaces, decreasing the traction and maneuverability of the track, it will even have a skidding effect on slippery surfaces. Whereas the track in the present invention will accommodate a plurality of ice screws and/or studs to improve traction and the maneuverability of the track when used on hard-packed snow and ice surfaces. The ice screws and/or studs have fine tips that will penetrate slippery surfaces for better traction and braking action, whereas ribs 117 will have a tendency to skid on slippery surfaces reducing traction and braking action.

Again reference is made to U.S. Pat. No. 4,613,006, FIG. 7 wherein cleats 115 have converging front and rear faces 118 and 119 to squeeze snow and mud downwardly from the track when they meet the flattened portion of the belt. Whereas in the present invention as shown in FIGS. 1, 2, 3, 4, and 5 the plurality of slots will displace snow, mud and other objects from the track by centrifugal force as the slots pass over the rotating front and rear drive pulleys.

The tread blocks and tread sections have front and rear faces perpendicular to the track's outer surface when the track is in a flat position, allowing the outer surface of the tread sections as shown in FIG. 1 to have a greater surface area bearing on the ground than cleats 115 as shown in U.S. Pat. No. 4,613,006, FIG. 6 would have. This enhances traction and the maneuverability of the track, with improved flotation in snow, and will cause less damage when used on a soft terrain such as mud, sand, or in wetland areas, etc. The convergency faces of cleats 115 reduce the outer peripheral surface area of the cleats from the lateral edges of the track towards the longitudinal center line of the track causing cleats 115 to have less surface area bearing on the ground, minimizing traction and flotation, and being more aggressive when used on soft terrains such as mud, sand and in wetland areas, etc.

BRIEF SUMMARY OF THE INVENTION

The present invention provides a novel form of endless drive track for snow vehicles and the like, incorporating moulded tread blocks and tread sections designed to be used on snow and other substratums. The tread sections are configured in a staggered pattern along the outer surface of the tread blocks by a plurality of slots providing both longitudinal and lateral traction on snow and other surfaces, improving the maneuverability of the track. The flat inner surface of the track having a drive mechanism thereon. The track will perform its maximum maneuverability when used on vehicles designed to be operated with a single ski or a wheel on the front for steering and support, and to be driven like a motorcycle.

The present invention has tread blocks and tread sections improving longitudinal and lateral traction on snow and other substratums improving the tracks maneuverability. Referring to inventors existing U.S. Pat. No. 4,613,006, FIG. 6 ribs 117 projecting outwardly from and extending transversely of the outer peripheral surface 116 of cleats 115 are parallel to the longitudinal axis of the track providing a minimal amount of forward traction on hard-packed snow, ice and other slippery surfaces reducing the maneuverability of the track considerably.

The present invention has a plurality of tread blocks divided into tread sections by a plurality of slots. The tread blocks and tread sections have front and rear faces perpendicular to the outer surface of the endless drive track providing the maximum tread section outer surface area bearing on the ground, allowing the track to have maximum flotation and traction with minimum aggressiveness when used on soft terrain. The tread sections will accommodate removable ice screws and/or studs for maximum traction and braking action when being used on slippery surfaces. The plurality of slots in the tread blocks reduces the weight of the track as well as displacing the accumulation of snow, mud and other objects from the track by centrifugal force when the slots pass over the rotating front and rear drive pulleys.

Referring to inventors existing U.S. Pat. No. 4,613,006, FIG. 7 wherein the converging faces 118 and 119 of cleats 115 squeeze snow and/or mud downwardly and free from the track when it is in a flattened position. This functional design of the converging faces of cleats 115 reduces the peripheral outer surface of cleats 115 bearing on the ground, reducing track flotation and increasing aggressive traction on soft terrain.

Another embodiment of the present invention is an endless drive track having tread blocks moulded to the outer surface of an endless underlying drive support belt. The tread blocks are divided into tread sections by a plurality of slots. The tread blocks and tread sections have front and rear faces perpendicular to the outer surface of the endless underlying drive support belt providing the maximum tread section outer surface area bearing on the ground, allowing the track to have maximum flotation and traction with minimum aggressiveness when used on soft terrain. The tread blocks having inward angles extending outward of the lateral edges of the endless underlying drive support belt. The tread blocks having a greater length than the width of the endless underlying drive support belt. The bottom end of the slots in the tread blocks are of an equal depth from the outer surface of the tread blocks. The slots divide the tread blocks into tread sections. Each tread section has its own radius. The combination of tread sections give the endless drive track a curved-like effect. The bottom end of the slots can also have a concaved radius bottom.

DETAILED DESCRIPTION OF THE INVENTION

Figure 1:
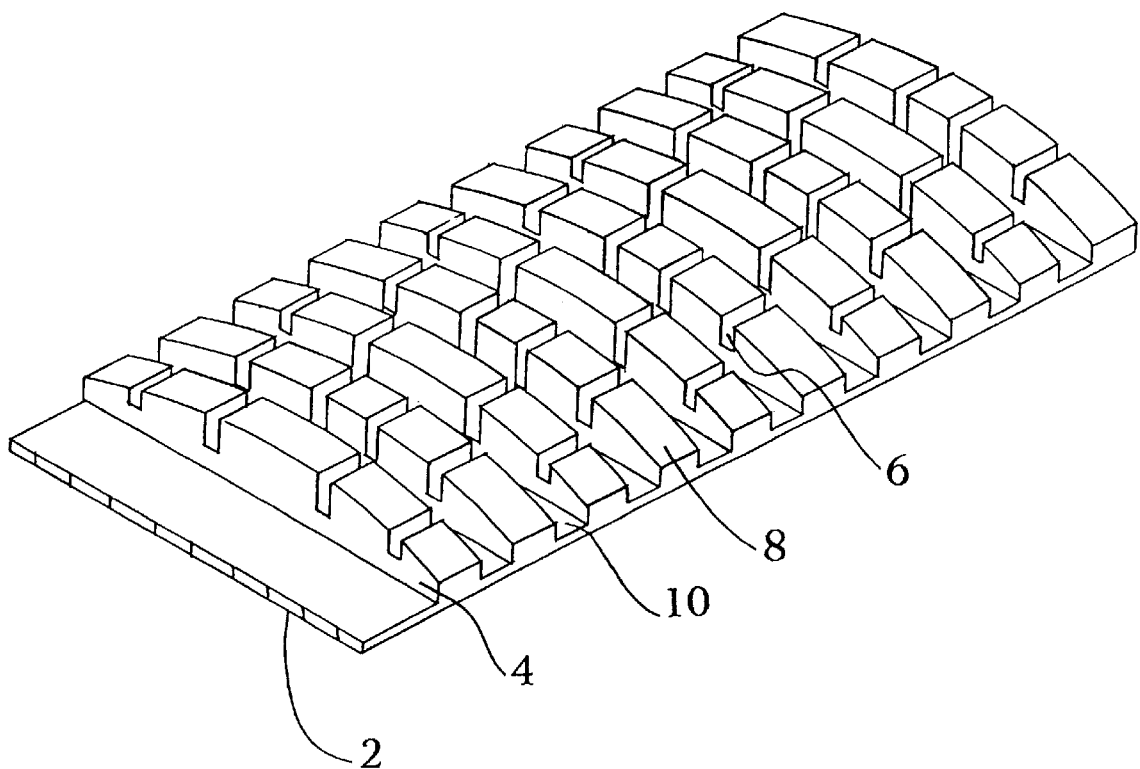
FIG. 1 is a perspective view of a cross-sectional area of the endless drive track

Reference is made firstly to FIG. 1 which illustrates an endless drive track preferably made from rubber with moulded tread blocks, and having an inner flat surface 2 having a drive mechanism thereon. The drive mechanism thereon is not shown in the drawings. A plurality of equally spaced tread blocks 4 are moulded transversely to the outer flat surface 10 of the endless drive track. The lower portion of tread blocks 4 is of a solid form adding rigidity to the lateral portion of the endless drive track. The upper portion of tread blocks 4 is divided into a plurality of tread sections 8 by a plurality of slots 6, slots 6 having a bottom end are strategically located in the plurality of tread blocks to cause a staggered pattern of tread sections with adjacent blocks. The bottom ends of slots 6 are of equal distance from the outer flat surface 10 of the endless drive track. Tread sections 8 increase in height from the lateral edges of the endless drive track towards the longitudinal centre line of the endless drive track, having their greatest height near the longitudinal centre line of the track. Each tread section 8 has its own radius. The combination of tread sections 8 along the outer peripheral surface of each tread block 4 will give tread blocks 4 a camber-like effect.

Figure 2:
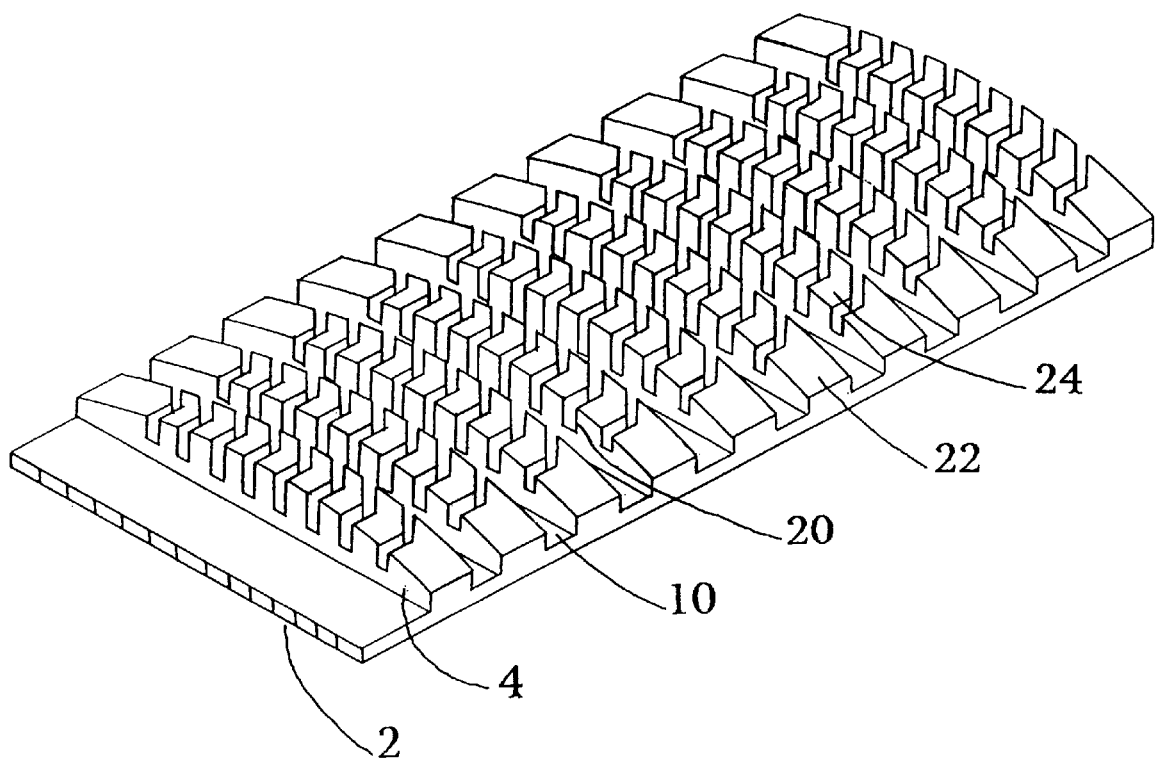
FIG. 2 is a perspective view of a cross-sectional area of another embodiment of the endless drive track.

Another embodiment of the invention as shown in FIG. 2 is an endless drive track having an inner flat surface 2 having a drive mechanism thereon. A plurality of tread blocks 4 are moulded transversely to the outer surface 10 of the track. The upper portion of tread blocks 4 have a plurality of slots 20 dividing the tread blocks into a plurality of tread sections 22 and 24. This configuration of tread sections is suited for snow surfaces, as well as mud, sand and other substratums. The plurality of slots as shown in FIG. 2 reduces the weight of the track considerably. Slots 20 shown in FIG. 2 can also have concaved radius bottom ends for increasing the rigidity of the tread blocks and reducing the possibility of the tread blocks stretching or breaking at the bottom end of the slots.

Figure 3:
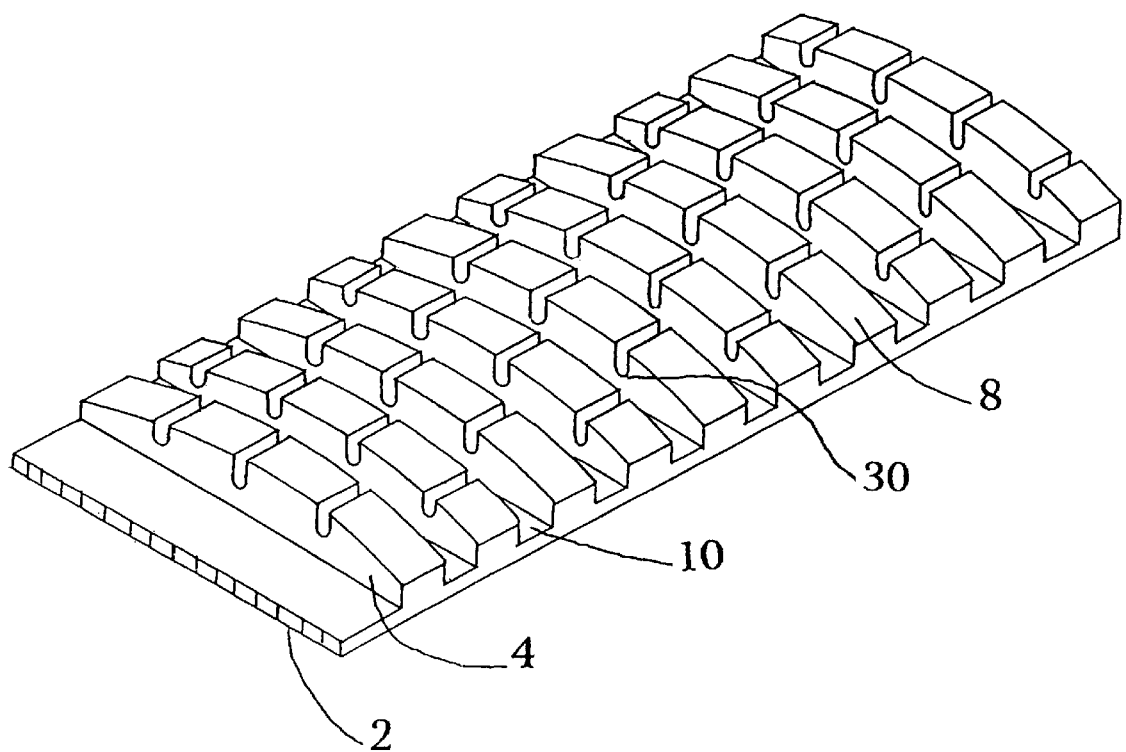
FIG. 3 is a perspective view of a cross-sectional area of another embodiment of the endless drive track.

Another embodiment of the invention as shown in FIG. 3 is an endless drive track having an inner flat surface 2 having a drive mechanism thereon. A plurality of tread blocks 4 are moulded transversely to the outer surface 10 of the track. The upper portion of tread blocks 4 have a plurality of slots 30. Slots 30 having a concaved radius bottom end divides the tread blocks into a plurality of tread sections 8. Slots 30 can also have tapered walls as shown in FIG. 4a. The concaved radius bottom increases the rigidity of the tread blocks, reducing the possibility of the tread blocks stretching or breaking at the bottom end of the slots. Slots 30 also help release snow, mud and other objects from the slots as they pass over the rotating front and rear drive pulleys.

Figure 4:
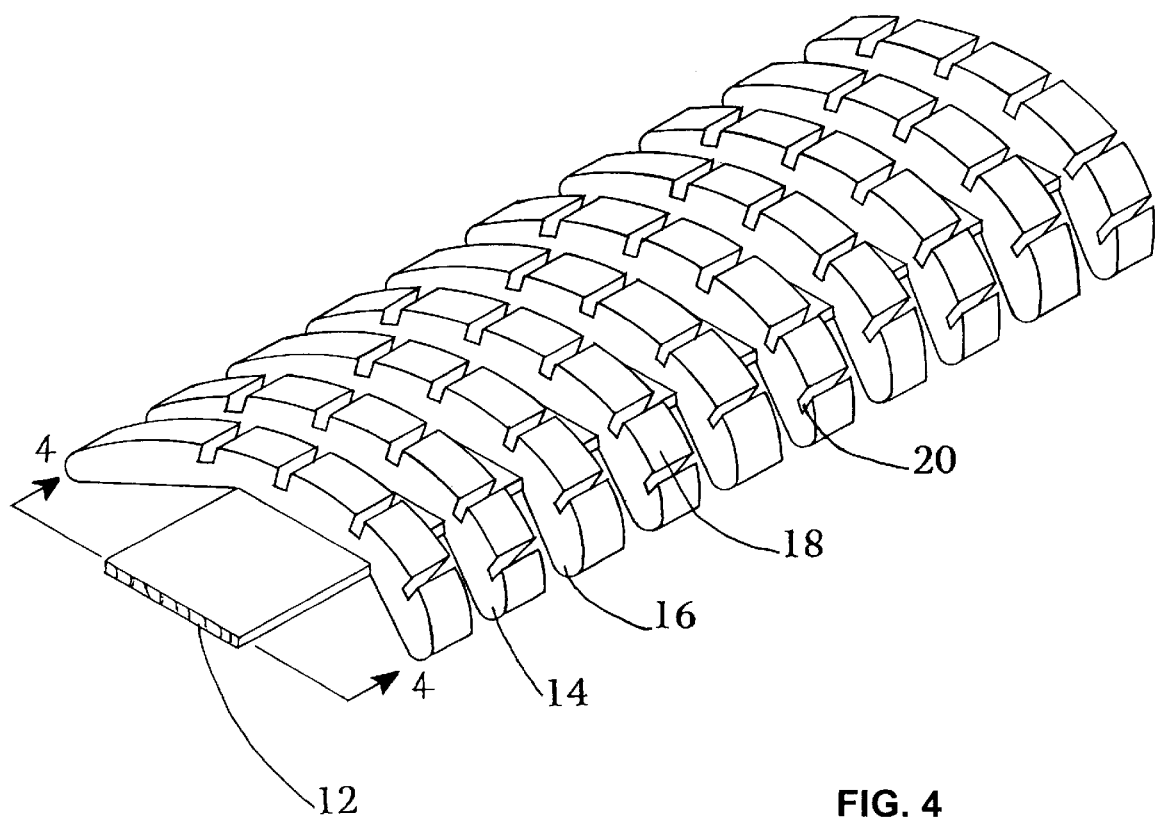
FIG. 4 is a perspective view of a cross-sectional area of another embodiment of the endless drive track
Figure 4A:
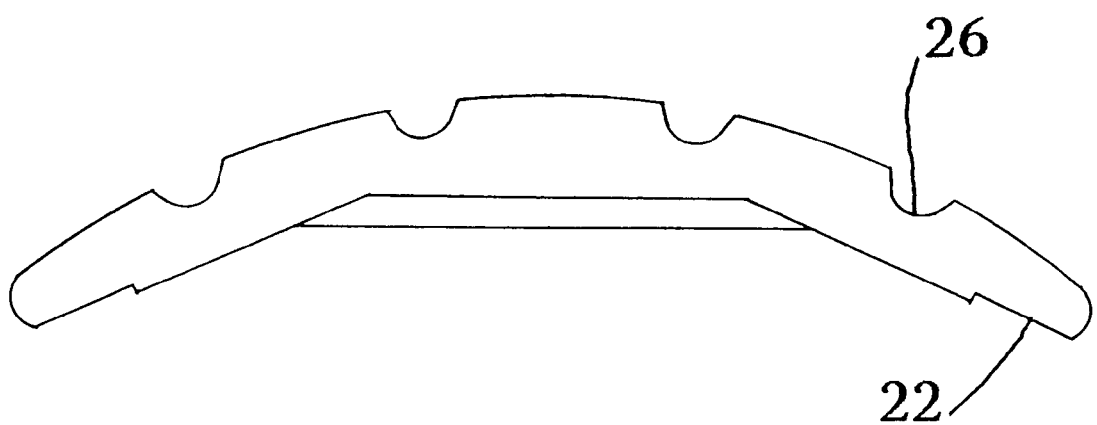
FIG. 4a is a front view on line 4—4 of FIG. 4 showing a tread block.

Another embodiment of the invention as shown in FIG. 4 is an endless drive track having an endless underlying drive support belt 12 having a flat inner and flat outer surface, having a drive mechanism thereon. The drive mechanism thereon is not shown in the drawing. A plurality of equally spaced tread blocks 14 having inward angles 16 are moulded transversely to the outer surface of the endless underlying drive support belt 12. Tread blocks 14 having a greater length than the width of the endless underlying drive support belt 12 extend beyond the lateral edges of the endless underlying drive support belt 12. The lower portion of tread blocks 14 is of a solid form adding rigidity to the lateral portion of the endless underlying drive support belt 12. The upper portion of tread blocks 14 is divided into a plurality of tread sections 18 by a plurality of slots 20. Slots 20 having a bottom end are strategically located in the plurality of tread blocks 14 to cause a staggered pattern of tread sections with adjacent blocks. Slots 20 in each of the tread blocks are of an equal depth from the outer surface of the tread blocks dividing the tread blocks into a plurality of tread sections 18 causing a staggered pattern with adjacent blocks. Each tread section 18 has its own radius, the combination of tread sections 18 along the outer peripheral surface of each tread block 14 will give tread blocks 14 a curved-like effect. As shown in FIG. 4a, the inward angles 16 of tread blocks 14 have chamfered edges 22 in the vicinity of the radius ends of the tread blocks to increase the clearance of the radius ends as they pass over the front and rear drive pulleys. Also shown in FIG. 4a, is a plurality of slots 26 having a concaved radius bottom end with tapered walls dividing the tread blocks into tread sections. Slots 26 are an alternative to the slots used in the endless drive tracks shown in FIGS. 1 and 4. Slots 26 will increase the rigidity of the tread blocks, reducing the possibility of the tread blocks stretching or breaking at the bottom end of the slots.

Figure 5:
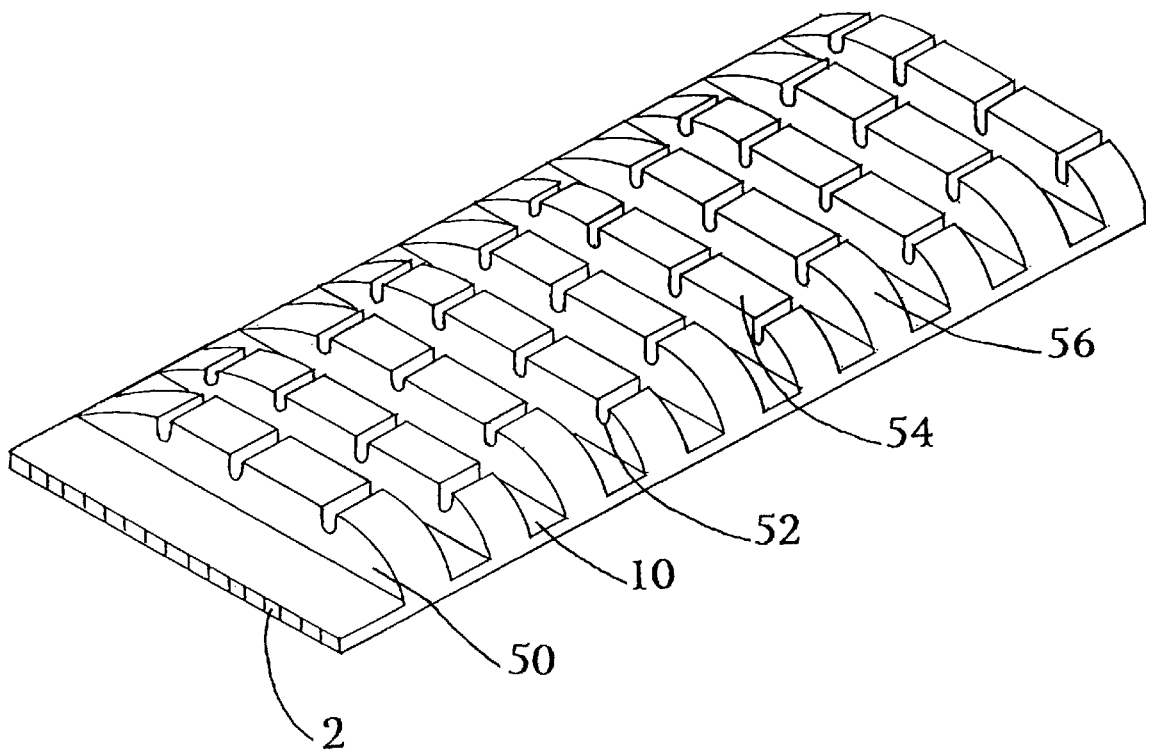
FIG. 5 is a perspective view of a cross-sectional area of yet another embodiment of the endless drive trace.

Another embodiment of the invention as shown in FIG. 5 is an endless drive track having a flat inner surface 2 having a drive mechanism thereon The drive mechanism thereon is not shown in the drawing. A plurality of tread blocks 50 are moulded transversely to the outer surface of the endless drive track 10. The lower portion of tread blocks 50 is of a solid form adding rigidity to the lateral portion of the endless drive track. The upper portion of tread blocks 50 has a plurality of slots 52. Slots 52 having a concaved radius bottom end increases the rigidity of the tread blocks, reducing the possibility of the tread blocks stretching or breaking at the bottom end of the slots. Slots 52 having a concaved radius bottom end can also have tapered walls as shown in FIG. 4a. The bottom end of slots 52 in tread blocks 50 are of an equal height from the outer flat surface 10 of the track. Slots 52 are of an equal depth dividing the tread blocks into a plurality of tread sections 54 and 56. Tread sections 54 are of an equal distance from the outer surface 10 of the endless drive track transversely of the tread blocks, with the exception of the outer most tread sections 56 of each of the tread blocks which have a convex radius meeting the lateral edges of the outer surface 10 of the endless drive track. This tread section configuration provides the track with a greater leaning angle increasing its maneuverability. When the track is performing in a straight forward motion most of the tread sections on the bottom surface of the track will be bearing on the ground, increasing traction on the surface it is travelling over.

I claim:

1. An endless drive track with lateral edges having a flat inner surface having a drive mechanism thereon; an outer surface comprising of a plurality of tread blocks equally spaced transversely along the outer surface of the track, each of the tread blocks is moulded to the outer surface of the track; the tread blocks comprise a solid base extending from the outer surface of the track to a point where the tread blocks have a plurality of slots; the bottom end of the slots in the tread blocks are of equal distance from the outer surface of the track, each of the slots are strategically located in the tread blocks to cause a staggered pattern with an adjacent block; the slots in each of the tread blocks have a shallow depth towards the lateral edges of the tread blocks increasing in depth towards the centre of the tread blocks having the greatest depth towards the longitudinal centre line of the track; each of the slots divides the tread blocks into a plurality of tread sections causing a staggered pattern with an adjacent block; the tread sections increase in height from the lateral edges of the tread blocks to the centre of the tread blocks having the greatest height towards the longitudinal centre line of the track; each of the tread sections has its own radius, the combination of tread sections along the upper portion of each of the tread blocks have a camber-like effect.

2. An endless drive track incorporating moulded tread blocks and tread sections as claimed in claim 1; wherein the track provides maximum maneuverability when used on vehicles designed to be operated with a single ski or a single wheel on the front for steering and support, and to be driven like a motorcycle; when the vehicle is resting on the ground in an upright position the tread sections near the longitudinal portion of the track will be bearing on the ground, this positioning of the track bearing on the ground is used for a straight forward motion of the track; for the vehicle to perform a maneuver to change direction it will lean from side to side depending on the desired direction, as would a motorcycle; when this maneuver is performed the bearing point of the track is changed from the centre longitudinal portion of the track and tread sections to a position between the longitudinal centre line of the track and tread sections to the lateral edges of the track and tread sections depending on the radius of the turn; in performing this maneuver and other maneuvers the bearing point of the track will always depend on the radius of at least one tread section transversely in each of the tread blocks along the entire longitudinal outer surface of the track bearing on the ground to maintain maximum traction with the ground and to provide good stability.

3. An endless drive track incorporating moulded tread blocks and tread sections as claimed in claim 1; wherein the plurality of slots in the tread blocks provide longitudinal and lateral traction by dividing the tread blocks into tread sections; the plurality of slots displace the accumulation of snow, mud and other objects from the track by centrifugal force when the slots pass over the rotating front and rear drive pulleys; the slots in the tread blocks further having a concaved radius bottom end; the vertical walls of the slots have a taper from the upper end of the slots downwardly to the concaved radius bottom end of the slots giving the slots a wider opening towards the upper end increasing traction and facilitating the release of snow, mud and other objects from the slots as they pass over the front and rear drive pulleys; the concaved radius bottom in the slots increases the rigidity of the tread blocks reducing the possibility of the tread blocks stretching or breaking in the vicinity of the slots, the plurality of slots reduces the overall weight of the track.

4. An endless drive track incorporating moulded tread blocks and tread sections as claimed in claim 1, wherein the plurality of tread blocks and tread sections have front and rear faces perpendicular to the outer surface of the track providing the maximum tread section outer surface area bearing on the ground, allowing the track to have maximum traction and minimum aggressiveness when used on soft terrain; the tread sections accommodate removable ice screws and/or studs for maximum traction and braking action when being used on slippery surfaces.

5. An endless drive track incorporating moulded tread blocks and tread sections as claimed in claim 1, wherein the tread blocks have a greater plurality of slots and tread sections in a V-like configuration reducing the weight of the track considerably while increasing traction; the slots in the tread blocks further having a concaved radius bottom end increasing the rigidity of the tread blocks and reducing the possibility of the tread blocks stretching or breaking in the vicinity of the slots, this tread section configuration will function well in deep powder snow, it is also suited for other applications such as mud, dirt, sand, and wetland areas.

6. An endless drive track incorporating moulded tread blocks and tread sections as claimed in claim 1, wherein the plurality of slots in the tread blocks dividing the tread blocks into tread sections have a concaved radius bottom end increasing the rigidity of the tread blocks and reducing the possibility of the tread blocks stretching or breaking in the vicinity of the slots; the concaved radius bottom end in each of the slots increases the release of snow, mud and other objects accumulated in the slots as the slots pass over the rotating front and rear drive pulleys; the vertical walls of the slots further having a taper from the upper end of the slots downwardly to the concaved radius bottom end of the slots giving the slots a wider opening towards the upper end, increasing traction and facilitating the release of snow, mud and other objects as the slots pass over the rotating front and rear drive pulleys.

7. An endless drive track incorporating moulded tread blocks and tread sections comprising a track having an endless underlying drive support belt with lateral edges having a flat inner surface having a drive mechanism thereon, a flat outer surface comprising of a plurality of tread blocks equally spaced transversely along the outer surface of the endless underlying drive support belt; the tread blocks having inward angles extending outward from the lateral edges of the endless underlying drive support belt; the tread blocks having a greater length than the width of the endless underlying drive support belt; the tread blocks having radius ends; each of the tread blocks is moulded to the outer surface of the endless underlying drive support belt; the tread blocks have a solid base extending from the outer surface of the endless underlying drive support belt and the bottom of the inward angles of the tread blocks to a point where the tread blocks have a plurality of slots; each of the slots is strategically located in the tread blocks to cause a staggered pattern with an adjacent block; the slots further having a concaved radius bottom end increasing the rigidity of the tread blocks and reducing the possibility of the tread blocks stretching or breaking in the vicinity of the slots; the vertical walls of the slots further having a taper from the upper end of the slots downwardly to the concaved radius bottom end of the slots; each of the slots is strategically located in the tread blocks to cause a staggered pattern with an adjacent block; the slots in each of the tread blocks are of an equal depth from the outer surface of the tread blocks dividing the tread blocks into a plurality of tread sections causing a staggered pattern with an adjacent block, each tread section has its own radius, the combination of tread sections along the upper portion of each of the tread blocks have a curved-like effect; the tread blocks inward angles extending outward from the lateral edges of the endless underlying drive support belt increases the tread blocks curved-like effect, allowing the track to have a greater leaning angle while lowering the vehicles centre of gravity and increasing its stability; the tread blocks inward angles extending outward from the lateral edges of the endless underlying drive support belt have chamfered edges in the vicinity of the radius ends of the tread blocks to increase the space in the vicinity of the radius ends of the tread blocks for passing over the front and rear drive pulley.

8. An endless drive track incorporating moulded tread blocks and tread sections as claimed in claim 7 wherein the plurality of slots in the tread blocks dividing the tread blocks into tread sections have a concaved radius at the bottom end of the slots, increasing the rigidity of the tread blocks and reducing the possibility of the tread blocks stretching or breaking in the vicinity of the slots; the slots in the tread blocks further comprising tapered walls from the upper end of the slots downwardly to the concaved radius bottom end of the slots; the slots are of an equal depth from the outer surface of the tread blocks, the slots divide the tread blocks into a plurality of tread sections; the tread sections are of an equal height transversely of the tread blocks, with the exception of the outer most tread sections of each of the tread blocks which have a convex radius; this tread section configuration provides the track with a greater leaning angle for maneuvering; when the track is performing in a straight forward motion most of the tread sections on the outer peripheral bottom of the track will bear on the ground increasing traction on the travel surface.

* * * * *